United States Patent
Kasasbeh et al.

(10) Patent No.: US 11,722,231 B2
(45) Date of Patent: Aug. 8, 2023

(54) SIGNAL SIGNATURE DETECTOR AND CLASSIFIER

(71) Applicant: Drone Go Home, LLC, Oceanport, NJ (US)

(72) Inventors: Hadi Kasasbeh, Ocean, NJ (US); Ziang Gao, Morganville, NJ (US); Taylor Sinatra, Millstone Township, NJ (US); Linda Ziemba, Highlands, NJ (US)

(73) Assignee: DRONE GO HOME, LLC, Oceanport, NJ (US)

(*) Notice: Subject to any disclaimer, the term of this patent is extended or adjusted under 35 U.S.C. 154(b) by 28 days.

(21) Appl. No.: 17/466,441

(22) Filed: Sep. 3, 2021

(65) Prior Publication Data
US 2022/0069923 A1    Mar. 3, 2022

Related U.S. Application Data

(60) Provisional application No. 63/074,055, filed on Sep. 3, 2020.

(51) Int. Cl.
*H04B 1/00*   (2006.01)
*H04B 17/21*   (2015.01)

(52) U.S. Cl.
CPC .................................. *H04B 17/21* (2015.01)

(58) Field of Classification Search
CPC ...... H04B 17/00; H04B 17/104; H04B 17/21; H04B 17/27; G01S 3/02; G01S 3/023; G01S 3/48; G01S 3/043; G08G 5/0008; G08G 5/0078; G08G 5/0082
See application file for complete search history.

(56) References Cited

U.S. PATENT DOCUMENTS

| | | | |
|---|---|---|---|
| 9,337,889 B1* | 5/2016 | Stapleford | H04B 1/123 |
| 10,281,570 B2 | 5/2019 | Parker et al. | |
| 11,585,886 B1* | 2/2023 | Meyer | H04B 1/0057 |
| 2021/0407305 A1* | 12/2021 | Jordan | G08G 5/0082 |

OTHER PUBLICATIONS

Hua Fu, Low-Complexity Portable Passive Drone Surveillance via SDR-Based Signal Processing, IEEE Communications Magazine, Apr. 2018, pp. 112-118, vol. 56, issue: 4, IEEE.

* cited by examiner

*Primary Examiner* — Tuan Pham
(74) *Attorney, Agent, or Firm* — Gearhart Law, LLC

(57) ABSTRACT

A Drone Detection System (DDS) listens passively to the Radio Frequency (RF) spectrum for a monitored area. If a drone-like signal is detected, the system alerts for the existence of a drone in the monitored area. This detection system may consist of multiple interconnected software and/or hardware-modules. Each module is responsible for extracting a certain physical feature (i.e., physical layer features) of the received signal (e.g. duty-cycle, bandwidth, power, center frequency, envelope in the time and frequency domains, type of modulation, frame size, etc.). The modular design of the system makes it easier to expand by adding more modules that can measure more physical features of the received signal. If the detector detects a signal with certain physical features, it may alert the existence of this signal along with its physical features and name of the most similar known signal from the library.

10 Claims, 7 Drawing Sheets

SIGNAL SIGNATURE DETECTOR AND CLASSIFIER

FIELD OF THE INVENTION

This application is a non-provisional application which claims priority to U.S. Provisional Application No. 63/074,055 filed Sep. 3, 2020, the disclosure of which is incorporated herein by reference.

This invention relates to surveillance systems used to detect and classify off-the-shelf customer type drone aircraft within a local area where the invention is deployed.

BACKGROUND OF THE INVENTION

As off-the-shelf drones (a.k.a unmanned aerial vehicles) are getting sophisticated, more powerful, cheaper, more popular, and equipped with high definition (HD) cameras, one cannot ignore the associated risks of having them in the hands of novices or criminals near sensitive and high profile buildings, critical infrastructure, organizations, people gatherings, etc. Unfortunately, drones are also being used by smugglers, and to infringe on peoples' privacy.

Developing a system that can detect the existence of these devices near or within a 'no-drone-fly' zone is of a great importance.

There have been many proposed approaches in the field (i.e. literature and patented inventions) to provide solutions, system designs, and algorithms to address the problem of drone system detection in an unauthorized area. The contributions differ in their ways of addressing the issue. In general, the proposed approaches in the field can be categorized into the following categories:
  Acoustic-detection based approach.
  Optical-detection based approach.
  Radar-detection based approach.
  Radio-frequency-detection (RF-detection) based approach.
  A combination of these approaches.

The acoustic, and optical approaches are known to be highly affected by the surrounding environmental variations such as weather, audible noise, and light pollution. These approaches are also very limited in range, since the physical features being detected cannot travel for long distances without getting attenuation or dispersion caused by the surrounding environment. A high false-alarm rate is also one of the acoustic and optical detection approaches downsides. Usually, the acoustic approach only provides detection without tracking; while the optical approach can provide both features.

The radar-based detection approach is known to have difficulty in detecting small targets and poor performance in terms of detected object classification. Also, a radar system is considered a system that transmits power on a certain frequency which makes it hard to deploy in some areas and/or countries depending on the regulations that govern the use of such frequency. The radar approach can provide long range detection and tracking features.

The RF-detection based approach cannot detect silent drones i.e. do not transmit RF power. The RF-detection approach is also difficult to implement in a noisy RF environment, and has medium range detection which is mainly limited by the transmitted RF power from the drone system device. The RF-detection approach overcomes some of the drawbacks of other approaches since its performance is not affected significantly by weather, the time of the day, or the size of the drone. The RF-detection approach is a passive approach since it only receives the radio signal from the drone system and does not need to transmit any power. The RF-detection approach is also capable of providing the detection, tracking, and classification features thanks to the power of signal processing and machine learning. Another important feature that distinguishes the RF-based approach from the rest is being the only approach capable of detecting the drone pilot (i.e. the controller) using its RF signal.

Any approach that can combine some or all of the previous approaches is supposed to perform better than any of them individually. Combining multiple approaches comes at the expense of complexity, cost, size, mobility, and regulatory hurdles.

SUMMARY OF THE INVENTION

Since the most common off-the-shelf drone type is the wireless type, and since the RF based detection is one of the most reasonable approaches to consider while designing a new drone detection system (based on the discussion provided in the Background section), in this invention we consider this approach to provide an RF drone detector and classifier design and algorithm.

Like any wireless system, a drone uses specific RF signals and channels to establish and maintain the communication with its controller. Since, these signals are transmitted over a radio channel, they can be detected by other RF receivers (e.g. sensors) upon reception. The physical layer features of the received signal (i.e. signal features/signature) can be analyzed by the sensor. Then, a matching between the detected signature and a known drone signature library takes place.

There are many signal physical features that can be considered as signatures. Some of the main features include: the communication channel frequency, signal bandwidth, duty-cycle, signal envelope/shape in the time and/or frequency domains, signal statistics, the signal's frequency hopping behavior, sleep and dwell time, etc.

Any combination of these main features can also be considered as a signature. The signature becomes more precise in describing the target signal if more features are considered. Considering more features in constructing a signature comes at the expense of complexity and processing time. Hence, the trade-off between accuracy and overhead should be considered in sensor design.

Usually, basic well-known signal processing techniques are used to measure such signal features; some of these techniques are: cross-correlation, auto-correlation, correlation coefficient, statistical distance, nearest neighbor, average/mean, moving average, energy detection, filtering, maximum, minimum, mode, median, variance, standard deviation, square, square root, power, Bayesian test detection, Neyman-Pearson test detection, etc.

In some detection systems, higher levels of reliability are added by having multiple sensors working independently or collectively to detect a target signal/object with specific features known to this system. The global decision can be made at a fusion center or within a mesh network using a combination of common global decision making methods such as K-out of-N, majority logic, "And" logic, "Or" logic, "X-or" logic, likelihood ration test, Bayesian inference-based global decision, artificial intelligence (AI)-based global decision, machine learning-based global decision, etc.

RF-based detection systems differ among each other based on how their designs utilize these basic and common signal processing techniques to achieve their end goal of detection, tracking, and classification. In this invention, the general design of each sensor in the system is given in FIG. 1.

FIG. 1 shows the decision making logic behind the invention's design. The preferred detection logic may start by energy detection needed for detecting the existence of an RF signal on the current frequency channel. The next stage is the signal physical features extraction which is needed in the next classification stage. The last stage is the reporting and alerting stage (if certain conditions are met by the received RF signal).

BRIEF DESCRIPTION OF THE DRAWINGS

For a more complete understanding of the invention, reference is made to the following description and accompanying drawings, in which.

DETAILED DESCRIPTION

Figure 1:
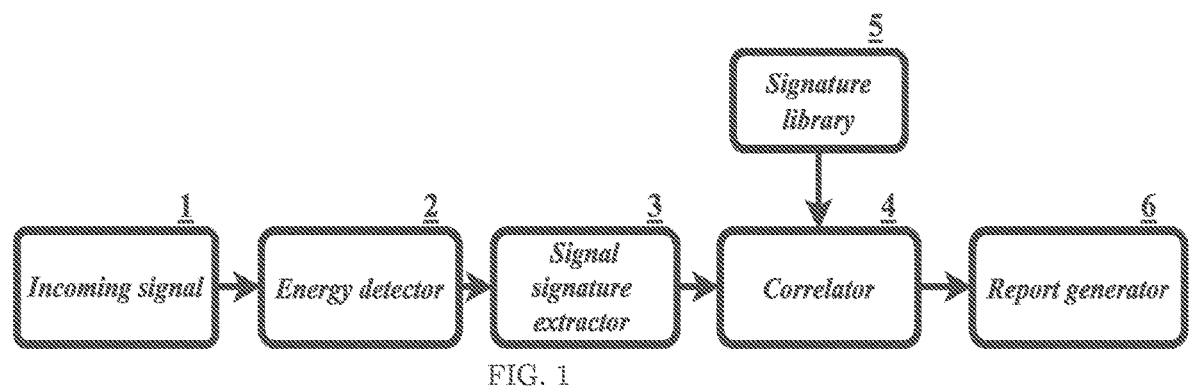
FIG. 1 General spectrum sensing/detection, and classification flow graph.

FIG. 1 shows the main block diagram of the proposed DDS. The DDS at first may measure the received RF signal FIG. 1.1 power/energy FIG. 1.2. If the measured power passes a pre-defined threshold, the received signal is carried forward for more processing, or if not, the DDS stays in this spectrum sensing stage until the received signal power crosses the energy threshold. The assumption is that if the signal power does not cross the energy detector's threshold, it is assumed to be noise, otherwise it is assumed to be an RF signal that needs more processing in order be to be categorized as a drone or a non-drone signal. This feature is important in reducing the processing overhead of the subsequent stages in the DDS. Note that the meaning of "pre-defined" or "pre-specified" anywhere in this document may mean static, dynamic, or adjusted by artificial intelligence/machine learning method.

In the case of a signal presence on the spectrum, the next stage may be to extract the signal physical features FIG. 1.3. Some of these features may include, but not limited to, the signal power, bandwidth (BW), central frequency ($F_c$), duty-cycle, signal shape (i.e. envelope) in the time and frequency domains, statistical features, modulation type, etc.

After extracting the signal's physical features, the next stage may be to compare (using a correlator stage FIG. 1.4 for example) these features with the features stored in a library of known signals FIG. 1.5.

At the reporting stage FIG. 1.6, the signal with the highest correlation value to the received signal may get reported as the signal existing on the spectrum. If none of the signals in the library achieves a correlation value above a correlation threshold (which could be dynamic or pre-defined), the DDS may record the received signal for a pre-defined time interval, and then may report it as an unknown signal along with its extracted features. If certain criteria are met in the extracted features (more details on that later in the patent) where the unknown signal has similar features to the features of drone signals, the DDS alarm may go off.

Figure 2:
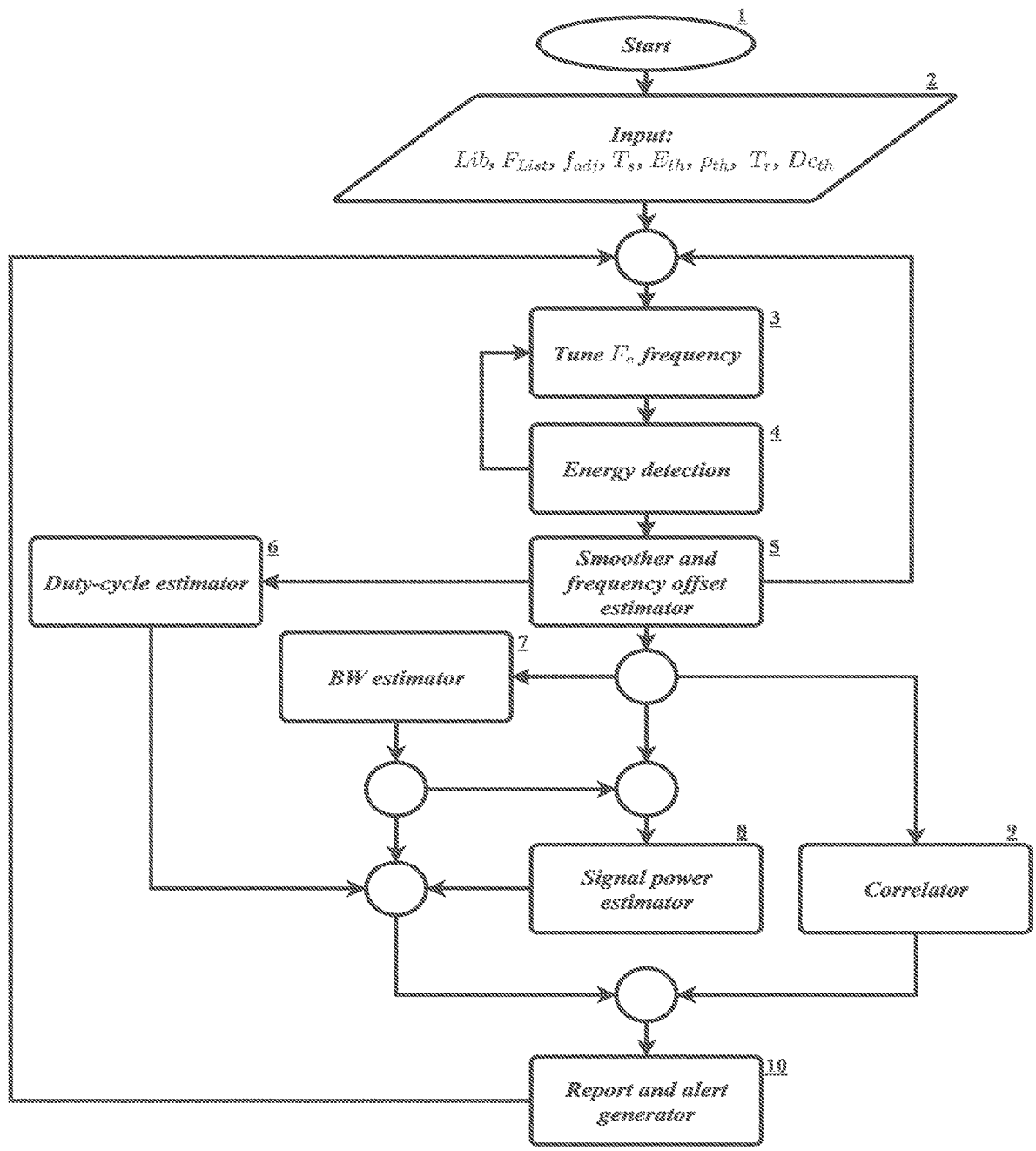
FIG. 2 Signature detector flow graph.

FIG. 2 shows a closer look at the components of the proposed DDS algorithm. The proposed DDS may have a modular design, this is an important design feature that makes the system expandable and easy to troubleshoot. FIG. 2 shows that the algorithm starts at FIG. 2.1 and FIG. 2.2 shows that input parameters may be imported from a designated database/memory holder/container (not shown in the figure). These parameters are needed to tune the system and allow its modules to operate as intended. Some of the preferred parameters include:

Library (Lib): a collection of the already known drone signals and their physical features (e.g. BW, duty-cycle, signal's frequency-domain envelope, statistical properties, type of modulation, etc.)

Frequency List ($F_{List}$): a list of central frequencies the invention's software defined radio central frequency can be tuned to sequentially, randomly, in a pre-specified order, or in a dynamic/adaptive order defined by machine learning or artificial intelligence method (e.g. Bayesian inference) in order to cover the whole needed spectrum for scanning. The elements in the frequency list can be chosen such that there is no overlapping between their corresponding frequency channels in order to speed up the scanning process while assuring the coverage of the whole needed spectrum.

Adjusting Frequency ($f_{adj}$): a value that is used in the tuning process to finely adjust the invention's central frequency in order to capture all the frequency components of the received signal of interest in the frequency domain. The value of this parameter can be initialized to zero.

Sensing Time ($T_s$): the staying period of time at each frequency channel that is needed to scan the channel in order to extract the existing signal's features (i.e. signature).

Energy Threshold ($E_{th}$): the energy detector's detection threshold. If the received signal's energy/power exceeds $E_{th}$, it is assumed to be an actual signal (i.e. not noise).

Correlation Coefficient Threshold ($\rho_{th}$): a the correlation threshold beyond which the received signal and a signal from the library are considered to be similar if their correlation value exceeds it.

Recording Time ($T_r$): if the received signal is considered unknown, then the algorithm may record this signal for a pre-defined time $T_r$.

Duty-cycle Detection Threshold ($Dc_{th}$): a duty-cycle threshold needed to roughly decide if the received signal is a video signal. It is worth mentioning that video signals are usually used by drones. Drone video signals have the feature of high duty-cycle values. Hence, if the signal's duty-cycle is larger than $Dc_{th}$, then most likely it is a video signal.

Figure 3:
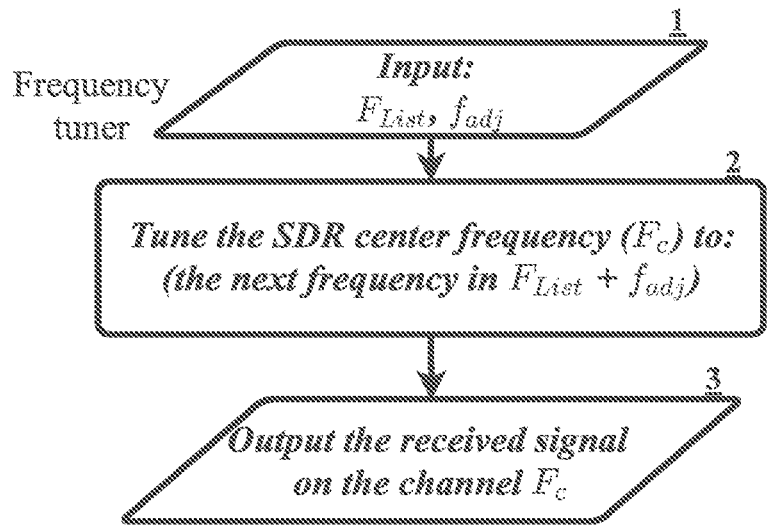
FIG. 3 Frequency tuner flow graph.
Figure 4:
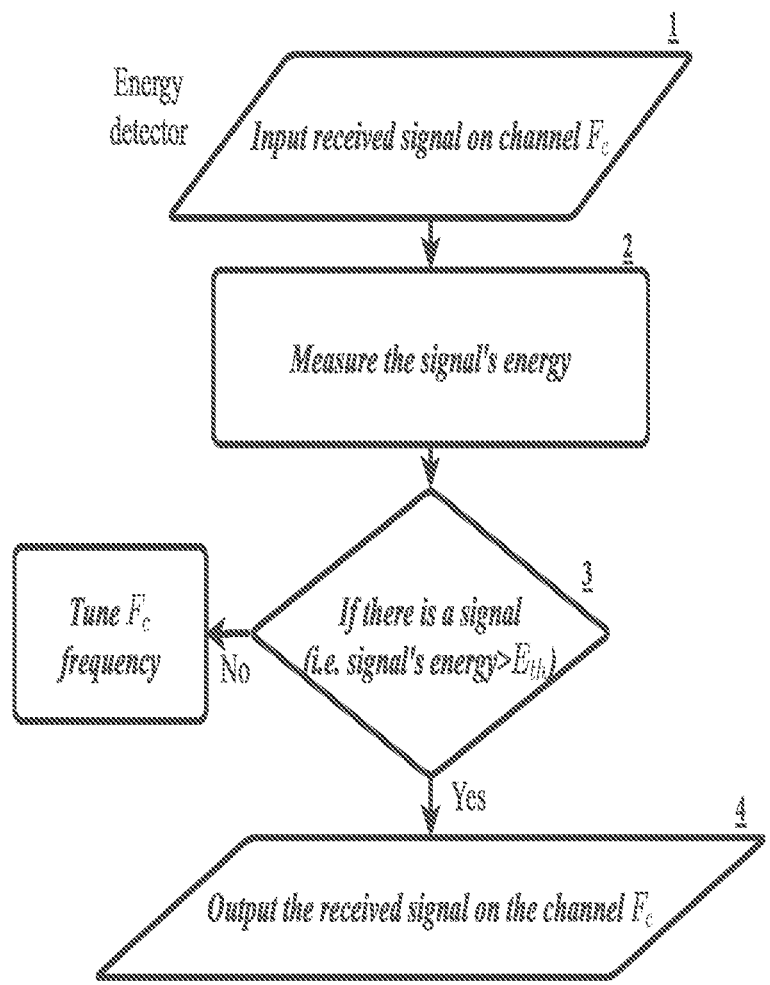
FIG. 4 Energy detector flow graph.

FIG. 2.3 explains the first stage in the algorithm which is tuning the invention's central frequency to the next frequency channel in the frequency list adjusted by the value received in the parameter $f_{adj}$. FIG. 3 shows a detailed description of the tuning process as it takes the frequency list and the $f_{adj}$ value as inputs and then tunes the invention's center frequency to the channel $F_c$, where $F_c$=next channel in $F_{List}+f_{adj}$ After tuning the invention's central frequency to $F_c$, the next stage may be the energy detection stage FIG. 2.4. The details of the energy detection process are shown in FIG. 4.

The energy detector takes the received signal on channel $F_c$ as input, then measures the total received power in the entire fast Fourier transform (FFT) window around $F_c$ (i.e. it measures the power of all signals (including noise and interference) present in the FFT window). If the measured power is found to be larger than a value $E_{th}$, then the DDS assumes there is an RF activity on $F_c$ channel that needs more processing. Otherwise, the energy detector assumes there is no activity worthy of further analysis. Hence, the energy detector may be used to direct the algorithm's logic flow back to the invention's center frequency tuning stage FIG. 2.3. The energy detection feature in the DDS is important since it can be used to reduce the algorithm processing overhead by bypassing the subsequent signal processing stages if no signal of interest present on channel $F_c$.

Figure 5:
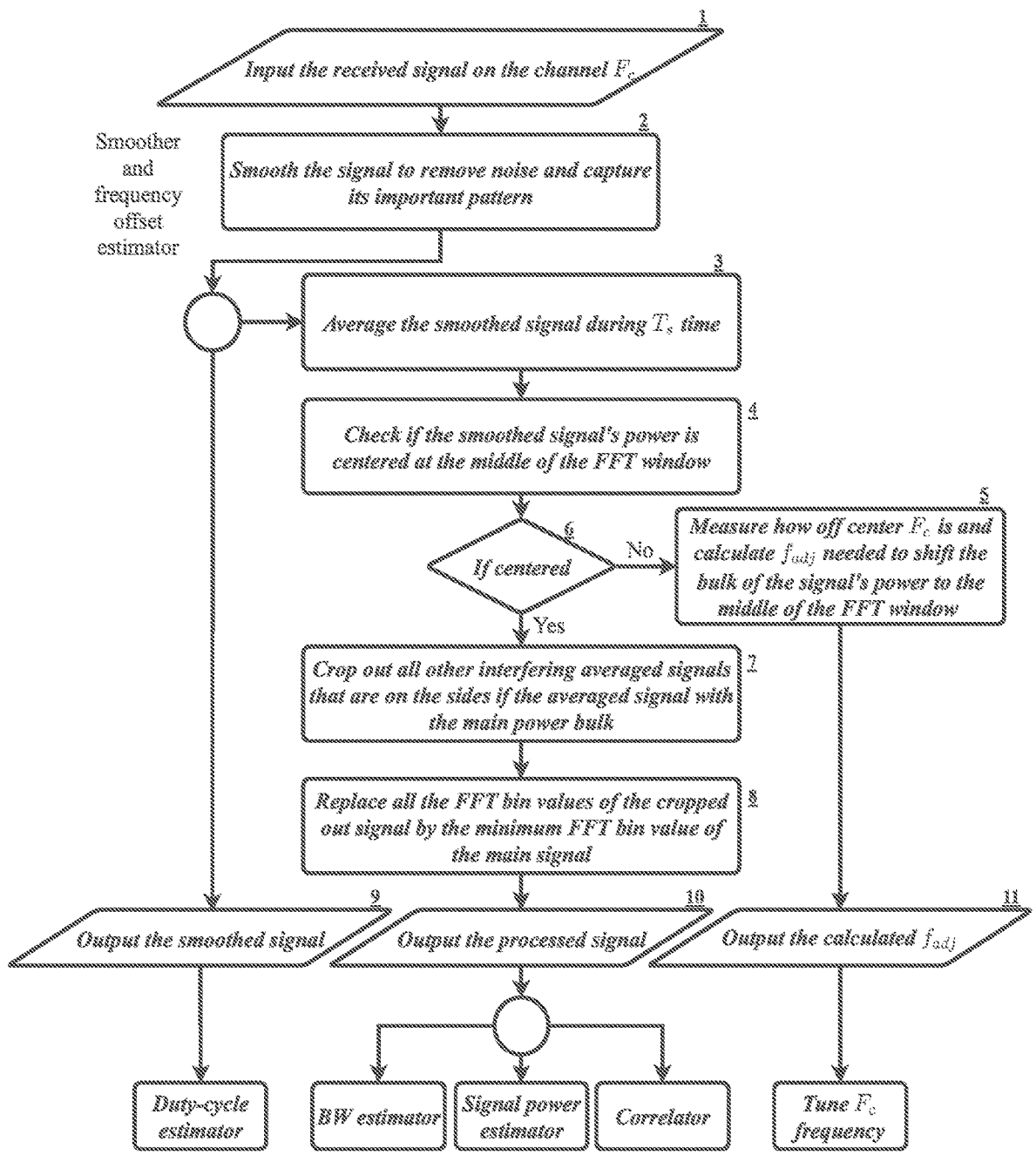
FIG. 5 Smoother and frequency offset estimator flow graph.

If the energy detector stage FIG. 2.4 assumes the existence of a signal on the channel $F_c$, then the DDS processing flow may go to the smoothing and frequency offset estimation stage FIG. 2.5. The smoothing and frequency offset estimation stage is given in more detail in FIG. 5 which takes the received signal on the channel $F_c$ as an input, then performs a smoothing operation FIG. 5.2 on it. The smoothing operation is needed in order to reduce the noise and capture the signal's important pattern (e.g. signal's envelope in the frequency domain). The smoothing operation can be any type of operation that performs signal smoothing (e.g. bandpass filter, lowpass filter, moving average, Savitzky-Golay filter, etc.). The generated smoothed signal may be fed to two destinations; the first is the duty-cycle estimator in FIG. 2.6 (presented in detail later in this section). The second destination is the averaging operation (FIG. 5.3) where the smoothed signal gets averaged (e.g. in the frequency domain) for a pre-defined period of time which can be same as $T_s$ (i.e. the sensing time). In the next operation, the module checks if the averaged signal's power is centered around $F_c$. If the power is not centered around $F_c$, the block measures how much $F_c$ should be adjusted/tuned (i.e. find $f_{adj}$) in order to have the signal power concentrated in the middle of the FFT window (FIG. 5.5). After that, the block sends the calculated $f_{adj}$ value to the SDR frequency tuner block in FIG. 2.3. On the other hand, if the averaged signal power is centered around $F_c$ in the frequency domain (i.e. the center of the FFT window), then in the next step the algorithm crops out the interfering signal parts (i.e. the signals that are around the main bulk of the power and have lower power values compared to the main bulk of power at the center) from the averaged signal. In the next step, the algorithm may replace each of the cropped FFT bin values that correspond to the average of the cropped interference signals, with a constant value. This constant value is the smallest FFT bin value from the remaining (un-cropped) FFT bins that correspond to the main power bulk at the center of the FFT window. The resulting signal can then be fed to the BW estimator block in FIG. 2.7, the signal power estimator block in FIG. 2.8, and the correlator block in FIG. 2.9 (these three blocks are explained next).

Figure 6:
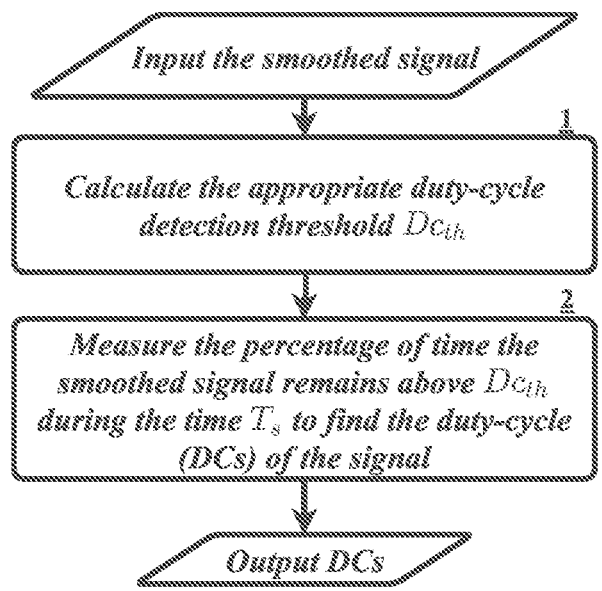
FIG. 6 Duty cycle estimator flow graph.

At the duty-cycle estimator block in FIG. 2.6, the duty-cycle of the smoothed signal (received from the smoothing and frequency offset estimator block in FIG. 2.5) is measured. The duty-cycle estimator block is explained in more detail in FIG. 6. In this block, since the signal could be received at any power, an adaptive statistical power threshold is measured from the received smoothed signal during a pre-defined time ($T_s$), then the duty-cycle of the same received smoothed signal is measured as the percentage of time the average power of the signal crosses above this statistical threshold during the period $T_s$.

Figure 7:
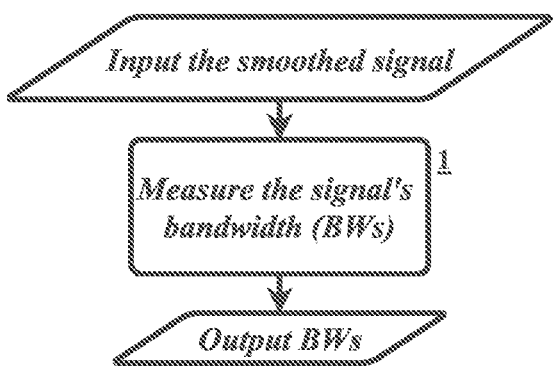
FIG. 7 Bandwidth estimator flow graph.

The received signal BW can be estimated using the BW estimator block in FIG. 2.7. The details of this BW estimation block are given in FIG. 7, where the input signal to this block is the one centered and cropped by the smoother and frequency offset estimator block in FIG. 5.10. Since the interfering signals surrounding the signal of interest are cropped out in the frequency domain and replaced by the minimum value of the FFT bins in the main signal, the BW of the main signal can be measured as the frequency distance between the minimum FFT bin and the maximum FFT bin of the main signal with power values larger than the minimum power value of the main signal.

Figure 8:
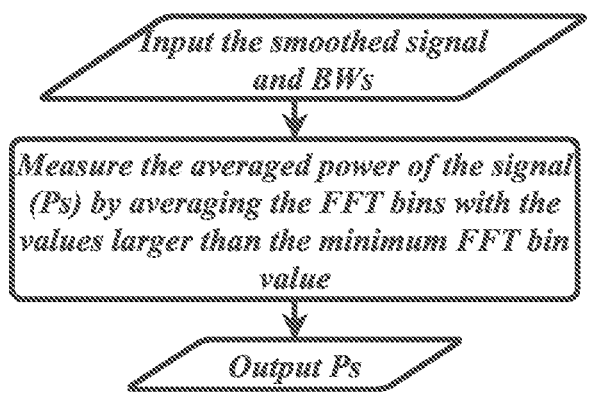
FIG. 8 Signal power estimator flow graph.

The average signal power is another feature that can be extracted using the signal power estimator in FIG. 2.8. As in FIG. 2, the signal power estimator block receives two inputs; the first is the signal coming from the smoother and frequency offset estimator block in FIG. 2.5, while the second input is the estimated signal BW value measured by the BW estimator in FIG. 2.7. FIG. 8 shows a detailed description about the operations happening inside the signal power estimator. This estimator uses the received signal (on the frequency and/or time domains) to average the FFT bins' power values around the center frequency of the FFT window and within BW/2 range on each side from this center (i.e. around the centered $F_c$). The resulting average is assumed to be the main signal's average power.

Figure 9:
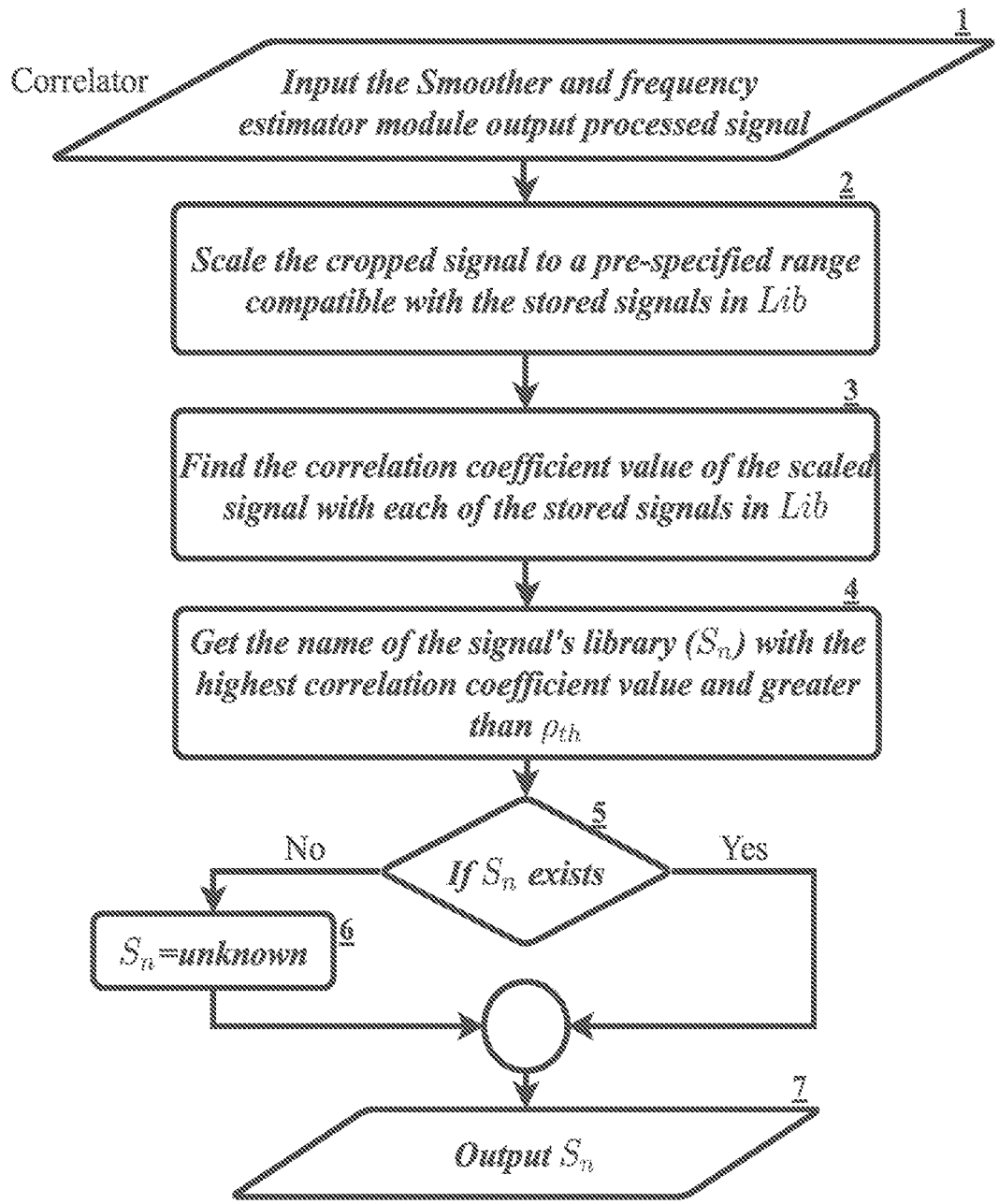
FIG. 9 Correlator flow graph.

The third block that takes the the processed signal coming from the smoother and frequency offset estimator block FIG. 2.5 is the correlator block FIG. 2.9. The main purpose of the correlator is to check if there is a match between the received signal's shape/envelope (on the frequency and/or domains) and one or multiple known drone signal shapes stored in the DDS library. Figure FIG. 9 presents a detailed description of the steps used in the correlator block. From the figure, the correlator scales the received signal to a pre-defined range of values that matches the range of all stored known signals in the library. This scaling is important as the received signal could have any power value which may affect the decision process later on. The next step in the correlator block is to find the correlation values (e.g. correlation coefficient values) between the scaled received signal and each of the signals stored in the library. Next, the correlator gets the library signal name ($S_n$) with the highest correlation coefficient value that is also larger than a pre-defined correlation threshold ($\rho_{th}$). If there is no signal from the library that satisfies this condition, the correlator classifies the signal as unknown (i.e. $S_n$=unknown). In the last step, the correlator reports the value of $S_n$, to the report and alert generator block in FIG. 2.10.

Figure 10:
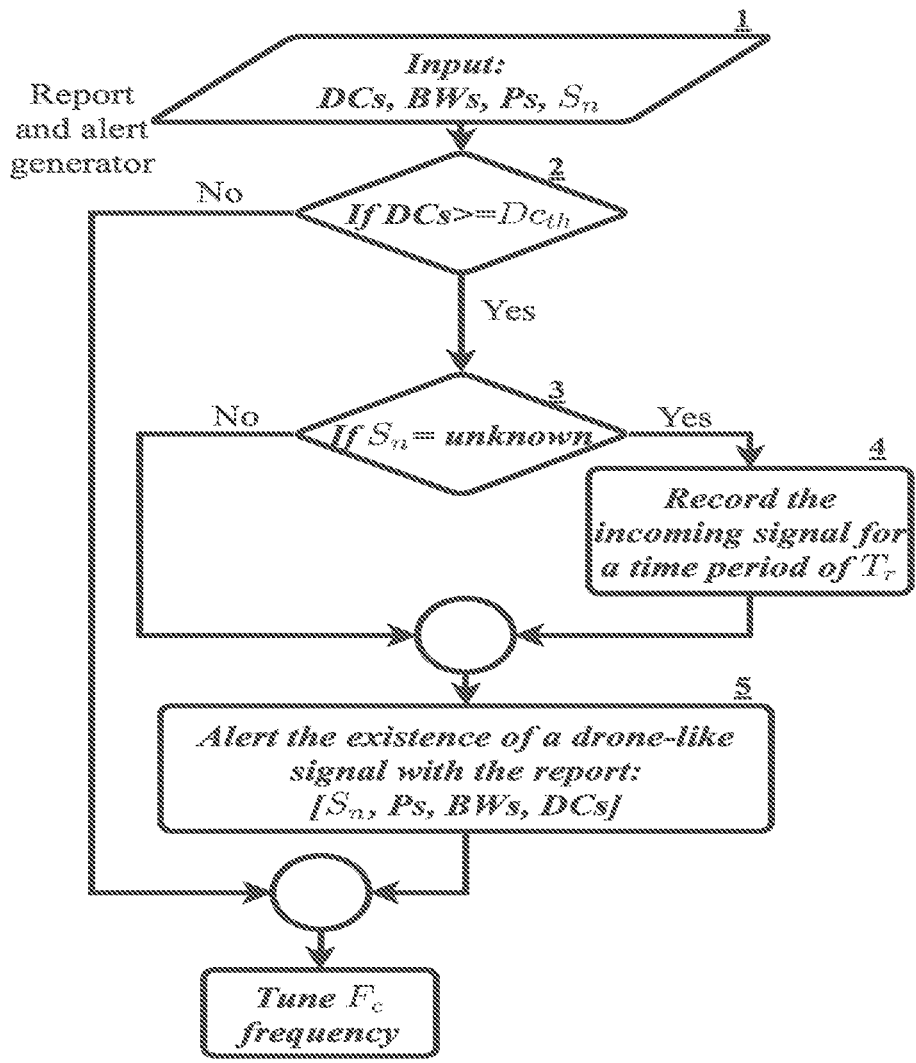
FIG. 10 Report and alert generator flow graph.

After measuring the received signal's duty-cycle, BW, power, and the most similar $S_n$, the corresponding blocks of these features may send these values to the last block in the DDS which is the report and alert generator FIG. 2.10. This block is shown in detail in FIG. 10. FIG. 10 shows that the report and alert generator block receives the values of $DC_s$, $BW_s$, $P_s$, and $S_n$. If the $DC_s$ is less than a pre-defined threshold ($Dc_{th}$), the report and alert generator block does not generate an alert about the detected signal since the duty-cycle is less than the needed threshold to consider the signal as a drone signal. Note that drone signals are most likely to be video signals which are known to have high duty-cycle values. On the other hand, if the duty-cycle of the received signal is larger than or equal to the duty-cycle threshold, the received signal is considered a drone signal. Before reporting and alerting about the drone signal presence, the report and alert generator block records the received signal for a pre-defined period of time ($T_r$) for future analysis if $S_n$=unknown. At the end, the report and alert generator block reports and alerts about the $S_n$ of the received signal along with its physical features and then the whole DDS algorithm may start from the beginning at the frequency tuner block (FIG. 2.3).

What is claimed:

1. A Drone Detection System (DDS) configured to detect Radio Frequency (RF) signals, the DDS comprising:
    more than one detection modules with each of the more than one detection modules being communicatively coupled to one another,
    wherein at least one of the more than one detection modules is configured to detect and receive a signal,
    wherein at least one of the more than one detection modules is configured to extract at least one feature from the signal, and
    wherein the at least one feature is compared to a known signal feature to determine if the signal is a drone signal, and
    further comprising a report and alert generator module,
    wherein the report and alert generator module collects features that were extracted by other modules in the DDS, generates a report about the signal, and generated at least one alert if a duty-cycle of the signal is higher than a pre-defined threshold.

2. The DDS of claim 1 further comprising a tuner module having a spectrum scanning module.

3. The DDS of claim 1 wherein the spectrum scanning module comprises a coarse tuning module and a fine tuning module.

4. The DDS of claim 2 wherein the tuner module scans for a signal and once the signal is detected determines a center frequency of the signal.

5. The DDS of claim 1 further comprising an energy detector module configured to detect the presence of a signal to be processed and/or classified afterwards by the one or more detection modules.

6. The DDS of claim 1 further comprising a smoother and frequency offset estimator module.

7. The DDS of claim 1 further comprising a duty-cycle estimator module configured to estimate a duty-cycle physical feature of the signal.

8. The DDS of claim 1 further comprising a bandwidth (BW) estimator module.

9. The DDS of claim 1 further comprising a smart signal power estimator nodule configured to extract a main signal and measure an average power value of the main signal.

10. The DDS of claim 1 further comprising a correlator module,
    wherein the correlator module processes the signal and measures a correlation value of the signal with each known signal in a correlator database.

* * * * *